US005670587A

United States Patent [19]
Takeuchi et al.

[11] Patent Number: 5,670,587
[45] Date of Patent: Sep. 23, 1997

[54] CATALYST FOR PRODUCING AROMATIC VINYL COMPOUND-BASED POLYMER COMPOSITION AND PROCESS FOR PRODUCING AROMATIC VINYL COMPOUND-BASED POLYMER COMPOSITION USING SAME

[75] Inventors: Mizutomo Takeuchi; Hajime Shouzaki; Norio Tomotsu; Masahiko Kuramoto, all of Ichihara, Japan

[73] Assignee: Idemitsu Kosan Co., Ltd., Tokyo, Japan

[21] Appl. No.: 537,868

[22] PCT Filed: Jul. 20, 1994

[86] PCT No.: PCT/JP94/01192

§ 371 Date: Jan. 23, 1996

§ 102(e) Date: Jan. 23, 1996

[87] PCT Pub. No.: WO95/03339

PCT Pub. Date: Feb. 2, 1995

[30] Foreign Application Priority Data

Jul. 23, 1993 [JP] Japan .................................. 5-182388

[51] Int. Cl.$^6$ .............................. C08F 4/643; C08F 12/04
[52] U.S. Cl. .................. 526/119; 526/113; 526/114; 526/116; 526/118; 526/126; 526/127; 526/132; 526/133; 526/134; 526/148; 526/151; 526/152; 526/153; 526/160; 526/170; 526/347; 502/113; 502/114; 502/115; 502/129; 502/132; 502/133; 502/152; 502/153; 502/154; 502/155
[58] Field of Search .................... 526/113, 114, 526/115, 116, 118, 119, 160, 170, 347, 126, 127, 132, 133, 134, 148, 151, 152, 153; 502/113, 152, 154, 155, 153, 114, 115, 129, 132, 133

[56] References Cited

U.S. PATENT DOCUMENTS

| | | | |
|---|---|---|---|
| 4,935,474 | 6/1990 | Ewen et al. | 526/119 X |
| 5,082,817 | 1/1992 | Abizzati et al. | 526/118 X |
| 5,260,394 | 11/1993 | Tazaki et al. | 526/160 X |
| 5,272,229 | 12/1993 | Tomotsu et al. | . |
| 5,294,685 | 3/1994 | Watanabe et al. | 526/160 X |
| 5,340,892 | 8/1994 | Kuramoto | 526/119 |
| 5,430,001 | 7/1995 | Tomotsu et al. | . |
| 5,461,128 | 10/1995 | Takeuchi et al. | . |

FOREIGN PATENT DOCUMENTS 8101289  5/1981  WIPO ................................. 526/160

Primary Examiner—Fred Teskin
Attorney, Agent, or Firm—Oblon, Spivak, McClelland, Maier & Neustadt, P.C.

[57] ABSTRACT

There are disclosed a catalyst for producing an aromatic vinyl compound-based polymer composition which catalyst comprises (A) at least two different transition metal compounds each having one π-ligand and (B) an ionic compound comprising a noncoordinate anion and a cation and/or an aluminoxane, and (C) a Lewis acid to be used as the case may be; and a process for producing an aromatic vinyl compound-based polymer composition having a high degree of syndiotactic configuration in its aromatic vinyl chains which process comprises polymerizing an (a) aromatic vinyl compound and (b) an olefinic compound and/or a diolefinic compound in the presence of the above catalyst. The catalyst according to the present invention, which has a high activity, can afford an resin composition comprising an aromatic vinyl compound-based polymer having a syndiotactic configuration and a rubbery elastomer, each being uniformly mixed therein, and thus the resin composition can efficiently be produced by the use of the above catalyst.

11 Claims, No Drawings

CATALYST FOR PRODUCING AROMATIC VINYL COMPOUND-BASED POLYMER COMPOSITION AND PROCESS FOR PRODUCING AROMATIC VINYL COMPOUND-BASED POLYMER COMPOSITION USING SAME

TECHNICAL FIELD

The present invention relates to a novel catalyst for the production of an aromatic vinyl compound-based polymer composition and to a process for the production of an aromatic vinyl compound-based polymer composition by using the same. More particularly, it pertains to a highly active catalyst for producing an aromatic vinyl compound-based polymer composition which catalyst comprises at least two different transition metal compounds each having one π-ligand and to a process for efficiently producing a resin composition which comprises an aromatic vinyl compound-based polymer having a high degree of syndiotactic configuration in its aromatic vinyl chains and a rubbery elastomer, both being uniformly mixed with each other by the use of the above-mentioned catalyst.

BACKGROUND ART

Heretofore, styrenic polymers produced by the radical polymerization method or the like have an atactic configuration in stereostructure and are molded to various shapes by various molding methods such as injection molding, extrusion molding, blow molding, vacuum molding and cast molding, and they have been widely used as domestic electrical appliances, office machines, household goods, packaging containers, toys, furnitures, synthetic papers, sheets, films and other industrial materials.

However, such styrenic polymers having atactic configuration have suffered the disadvantage that they are inferior in heat resistance and chemical resistance.

The group of the present inventors has previously succeeded in developing styrenic polymers having a high degree of syndiotacticity (see Japanese Patent Application Laid-Opent Nos. 187708/1987, 179906/1988, 241009/1988, 249504/1992 etc.).

On the other hand, since the styrene polymers having a syndiotactic configuration have melting points which are different from those of the conventional atactic polystyrenes, and are higher than those of the isotactic polystyrenes known so far, they are expected to be used as heat-resistant resins in various fields.

Moreover, in order to efficiently take advantage of the heat resistance, investigation has been made on the blending of the syndiotactic polystyrene with different kinds of resins (refer to Japanese Patent Application Laid-Open Nos. 257950/1987, 146944/1989, 279944/1989, etc.)

Of these, there has been obtained a resin composition improved in impact resistance by the blending with a rubbery elastomer. However, in the production of the composition of the syndiotactic polystyrene with the rubbery elastomer, blending was carried out by kneading, but it has been required to sufficiently perform the kneading for the purpose of attaining satisfactory dispersibility of each component. It is necessary in this case, to cut the rubbery elastomer into small pieces prior to the kneading because of the elasticity imparted to the rubbery elastomer. However, some problems still remain in the handling of the rubbery elastomer owing to its elasticity and also in that during the course of kneading the styrenic poymer having a syndiotactic configuration at an elevated temperature because of its high melting point, the kneading brings about lowering in the molecular weight of the resin composition to be produced, deterioration of the resin composition itself, progress of the rubber crosslinking and the like, if an excessive shear force is applied over a long time to carry out sufficient kneading.

Under such circumstances, it was found by the group of the present inventors that the rubbery elastomer is favorably dispersed and a resin composition having excellent impact resistance is obtained by polymerizing or copolymerizing a styrenic monomer in the presence of a specific catalyst in the system in which the rubbery elastomer is allowed to be present in advance in order to solve the above-mentioned problems. Thus, the process for producing the aforesaid resin composition was proposed before (refer to Japanese Patent Applicaiton Laid-Open No. 211410/1992.) Nevertheless, the above-proposed process has still involved the problem that since the catalyst for the production of a styrenic polymer having a syndiotactic configuration through the polymerization or copolymerization of a styrenic monomer is sensitive to an impurity, the catalyst activity is often impaired by a slight amount of impurities that are present in the rubbery elastomer and therefore, sufficient attention must be paid to the purification, drying and the like of the rubbery elastomer in question.

DISCLOSURE OF THE INVENTION

Under such circumstances the present invention was attempted for the purpose of providing a highly active catalyst capable of producing, in a reaction system, a resin composition in which an aromatic vinyl compound-based polymer having a syndiotactic configuration and a rubbery elastomer are uniformly mixed as well as a process for efficiently producing the resin composition by the use of the above-mentioned catalyst.

It has been previously found by the group of the present inventors that in the case where styrene is polymerized in the presence of an olefin, a diolefin or the like by the use of a highly active catalyst (transition metal compound component) that is capable of producing a styrenic polymer having a syndiotactic configuration, there is obtained a rubbery elastomer such as a styrene/olefin copolymer and a styrene/diolefin copolymer which elastomer is lowerd in its glass transition temperature and improved in impact resistance and in adhesivity to or compatibility with different thermoplastic resins or inorganic fillers (refer to Japanese Patent Application Laid-Open Nos. 7705/1991, 258811/1990, 300904/1992, etc.)

As a result of intensive research and investigation accumulated by the present inventors in order to attain the above-mentioned object paying attention to the aforesaid finding, it has been found that a catalyst which comprises at least two different transition metal compounds each having one π-ligand, a specific ionic compound and/or an aluminoxane, and optionally a Lewis acid to be used as the case may be, has high activity and can efficiently produce a resin composition in which an aromatic vinyl compound-based polymer having a syndiotactic configuration and a rubbery elastomer are uniformly mixed. The present invention has been accomplished by the above-mentioned finding and information.

Specifically the present invention provides a catalyst for producing an aromatic vinyl compound-based polymer composition which catalyst comprises an (A) at least two different transition metal compounds each having one π-ligand;

a (B) ionic compound comprising a non-coordinate anion and a cation and/or an aluminoxane; and a (C) Lewis acid to be used as the case may be. It also provides a process for producing an aromatic vinyl compound-based polymer composition having a high degree of syndiotactic configuration in its aromatic vinyl chains which process comprises polymerizing an (a) aromatic vinyl compound and (b) at least one member selected from olefinic compounds and diolefinic compounds in the presence of the above-described catalyst.

THE MOST PREFERRED EMBODIMENT TO CARRY OUT THE INVENTION

There are used, as the component (A), at least two transition metal compounds each having one π-ligand in the catalyst for producing an aromatic vinyl compound-based polymer composition according to the present invention.

As the aforesaid transition metal compound having one-ligand, there is usable, for example, a compound represented by the general formula (I)

wherein $R^1$ is a π-ligand and is specifically exemplified by a cyclopentadienyl group, substituted cyclopentadienyl group, indenyl group, substituted indenyl group, fluorenyl group, etc.; $M^1$ is a transition metal in the groups 3 to 6 of the Periodic table, and is specifically exemplified by titanium, zirconium, hafnium, lanthanoids, niobium, tantalum, etc.; $X^1$ is a σ-ligand and is exemplified by a hydrogen atom, a hydrocarbon group having 1 to 20 carbon atoms, an aromatic hydrocarbon group having 6 to 20 carbon atoms, an alkoxyl group having 1 to 20 carbon atoms, an aryloxyl group having 6 to 20 carbon atoms, a thioalkoxyl group having 1 to 20 carbon atoms, a thioaryloxyl group having 6 to 20 carbon atoms, an amino group, an amide group, a carboxyl group, an alkylsilyl group and a halogen atom, and a plurality of $X^1$ may be the same or different and may be bonded to each other through an arbitrary group; L is a Lewis base; a is the valency of $M^1$; b is 0, 1 or 2; and when L is plural, each L may be the same or different.

More specific examples of $R^1$ include a cyclopentadienyl group; methylcyclopentadienyl group; 1,2-dimethylcyclopentadienyl group; 1,3-dimethylcyclopentadienyl group; 1,3-di(tert-butyl) cyclopentadienyl group; 1,3-di(trimethylsilyl) cyclopentadienyl group; 1,2,3-trimethylcyclopentadienyl group; 1,2,4-trimethylcyclopentadienyl group; 1,2,3,4-tetramethylcyclopentadienyl group; pentamethylcyclopentadienyl group; 1-ethyl-2,3,4,5-tetramethylcyclopentadienyl group; 1-benzyl-2,3,4,5-tetramethylcyclopentadienyl group; 1-phenyl-2,3,4,5-tetramethylcyclopentadienyl group; 1-trimethylsilyl-2,3,4,5-tetramethylcyclopentadienyl group; 1-trifluoromethyl-2,3,4,5-tetramethylcyclopentadienyl group; 1,2,3-trimethylindenyl group; heptamethylindenyl group; and 1,2,4,5,6,7-hexamethylindenyl group.

More specific examples of $X^1$ include a hydrogen atom, chlorine atom, bromine atom, iodine atom, methyl group, benzyl group, phenyl group, trimethylsilylmethyl group methoxy group, ethoxy group, phenoxy group, thiomethoxy group, trimethylamino group, dimethylamino group, and diisopropylamino group.

As the transition metal compound represented by the foregoing general formula (I), there is preferably usable the compound containing $R^1$ and $X^1$ each arbitrarily selected from those exemplified above.

As the above-mentioned transition metal compound having one π-ligand, there is also usable a compound represented by the general formula (II)

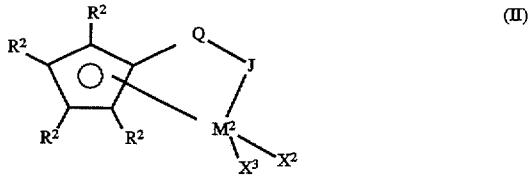

wherein $R^2$ is a hydrogen atom, a hydrocarbon group having 1 to 20 carbon atoms or an aromatic hydrocarbon group having 6 to 20 carbon atoms, and a plurality of $R^2$ may be the same or different and may form a ring through an arbitrary group; $M^2$ is a transition metal in the group 3 to 6 of the Periodic table and is specifically exemplified by those same as those exemplified in the definition of the foregoing $M^1$; $X^2$ and $X^3$ are each a σ-ligand, are specifically exemplified by those same as those exemplified in the definition of the foregoing $X^1$, and may be the same or different; Q is a hydrocarbon group having 1 to 6 carbon atoms, an aromatic hydrocarbon group having 6 to 20 carbon atoms, a silylene group having 1 to 5 silicon atoms, or a germylene group having 1 to 5 germanium group; and J is an amide group, a phosphide group, an oxygen atom, a sulfur atom or an alkylidene group.

Examples of the transition metal compound represented by the foregoing general formula (II) include (tert-butyramide) (1,2,3,4-tetramethycyclopentadienyl)-1,2-ethanediyltitanium dichloride; (tert-butyramide)(1,2,3,4-tetramehylcyclopentadienyl)-1,2-ethanediyldimethyltitanium; (tert-butyramide)(1,2,3,4-tetramethylcyclopentadienyl)-dimethylsilytitanium dichloride; (tert-butyramide)(1,2,3,4-tetramethylcyclopentadienyl)-dimethylsilyldimethyltitanium; (tert-butyramide)(2,3-dimethylindenyl)-dimehylsilyltitanium dichloride; (tert-butyramide)(2,3-dimethylindenyl)-dimethylsilyldimethyltitanium; (tert-butyramide)(2,3,4,5,6,7-hexamethylindenyl)-dimethylsilyltitanium dichloride; (tert-butyramide)(2,3,4,5,6,7,-hexamethylindenyl)-dimethylsilyldimethyltitanium; (tert-butyramide)(1,2,3,4,5,6,7-hexamethylindenyl)-dimehylsilyltitanium dichloride; (tert-butyramide)(1,3,4,5,6,7-hexamethylindenyl)-dimethylsilyldimethyltitanium; (1,2,3,4-tetramethylcyclopentadienyl)-1-ethane-2-oxatitanium dichloride; (1,2,3,4-tetramethylcyclopentadienyl)-1-ethane-2-oxadimethyltitanium; (tert-butyramide)(1,2,3,4-tetramethylcyclopentadienyl)-1,2-ethanediylzirconium dichloride; (tert-butyramide)(1,2,3,4-tetramethylcyclopentadienyl)-1,2-ethanediyldimethylzirconium; (tert-butyramide)(1,2,3,4-tetramethylcyclopentadienyl)-dimethylsilylzirconium dichloride; (tert-butyramide)(1,2,3,4-tetramethylcyclopentadienyl)-dimethylsilyldimethylzirconium; (tert-butyramide)(2,3-dimethylindenyl)-dimethylsilylzirconium dichloride; (tert-butyramide)(2,3-dimethylindenyl)-dimethylsilyldimethylzirconium; (tert-butyramide)(2,3,4,5,6,7-hexamethylindenyl)-dimethylsilylzirconium dichloride; (tert-butyramide)(2,3,4,5,6,7-hexamethylindenyl)-dimethylsilyldimethylzirconium; (tert-butyramide)(1,3,4,5,6,7-hexamethylindenyl)-dimethylsilylzirconium dichloride; (tert-butyramide)(1,2,3,4,5,6,7-hexamethylindenyl)-dimethylsilyldimethylzirconium; (1,2,3,4-tetramethylcyclopentadienyl)-1-ethane-2-oxazirconium dichloride; and (1,2,3,4-tetramethylcyclopentadienyl)-1-ethane-2-oxadimethyltitanium.

It is necessary, in the catalyst according to the present invention, to simultaneously use at least two different transition metal compounds as the component (A). In particular, it is preferable that at least one transition metal compound represented by the foregoing general formula (I) be used in combination with at least one transition metal compound represented by the foregoing general formula (II).

In the catalyst according to the present invention, there is used, as the component (B), an ionic compound comprising a noncoordinate anion and a cation and/or an aluminoxane.

Examples of the ionic compound comprising a noncoordinate anion and a cation as the component (B) include a compound represented by the general formula (III) or (IV)

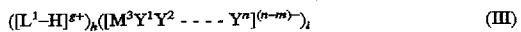  (III)

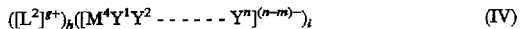  (IV)

wherein $L^2$ is $M^5$, $R^3R^4M^6$ or $R^5{}_3C$ as hereinafter described; $L^1$ is a Lewis base; $M^3$ and $M^4$ are each an element selected from Groups 5 to 15 of the Periodic Table and exemplified by B, Al, P, As and Sb; $M^5$ is an element selected from Groups 8 to 12 of the Periodic Table and exemplified by Ag and Cu; $M^6$ is an element selected from Groups 8 to 10 of the Periodic Table and exemplified by Fe, Co and Ni; $y^1$ to $Y^n$ are each a hydrogen atom, dialkylamino group, alkoxy group, aryloxy group, alkyl group having 1 to 20 carbon atoms, aryl group having 6 to 20 carbon atoms, arylalkyl group, alkylaryl group, substituted alkyl group, organometalloid group or halogen atom and exemplified by dimethylamino group, diethylamino group, methoxy group, ethoxy group, butoxy group, phenoxy group, 2,6-dimethylphenoxy group, methyl group, ethylgroup, propyl group, butyl group, octyl group, phenyl group, tolyl group, xylyl group, mesityl group, benzyl group, pentafuluorophenyl group, 3,5-di(trifluoromethyl)group, 4-tert-butylphenyl group, F, Cl, Br, I, pentamethylantimony group, trimethylsilyl group, trimethylgermyl group and diphenylboron group; $R^3$ and $R^4$ are each a cyclopentadienyl group, substituted cyclopentadienyl group, indenyl group, substituted indenyl group or fluorenyl group and exemplified by methycyclopentadienyl group and pentamethylcyclopentadienyl group; $R^5$ is an alkyl group, aryl group or a substituted aryl group, may be the same or different and exemplified by a phenyl group, 4-methoxyphenyl group and 4-methylphenyl group; m is the valency of each of $M^3$ and $M^4$, indicating an integer from 1 to 7; n is an integer from 2 to 8; g is the ion valency of each of $[L^1-H]$ and $[L^2]$, indicating an integer from 1 to 7; h is an integer of 1 or greater and i=(h×g)/(n−m).

Examples of the noncoordinate anion in the aforestated ionic compound indlude (tetraphenyl)borate; tetra (fluorophenyl)borate; tetrakis(difluorophenyl)borate; tetrakis(trifluorophenyl)borate; tetrakis(tetrafluorophenyl) borate; tetrakis(pentafluorophenyl)borate; tetrakis (trifluoromethylphenyl)borate; tetra(tolyl)borate; tetra (xylyl)borate; (triphenylpentafluorophenyl)borate; [tris (pentafluorophenyl)phenyl]borate and tridecahydride-7,8-dicarbaundecarborate. Examples of the cation in the abovementioned ionic compound include triethyl ammonium; tributyl ammonium; N,N-dimethylanilinium; N,N-diethylanilinium; triphenylphosphinium; dimethylphenylphosphinium; 1,1'-dimethylferrocene; decamethylferrocene; silver (I); triphenylcarbenium; tritolylcarbenium; trimethoxyphenylcarbenium; [di(tolyl)phenyl]carbenium; [di(methoxyphenyl)phenyl]carbenium and [methoxyphenyl, di(phenyl)]carbenium.

The above-mentioned ionic compound can preferably be used by optionally selecting the noncoordinate anion and cation from among the above-exemplified ones and combining the selected ones.

The aluminoxane as the above-mentioned catalyst component (B) is obtained by bringing an organoaluminum compound into contact with a condensation agent and is exemplified by chain aluminoxane represented by the general formula (V)

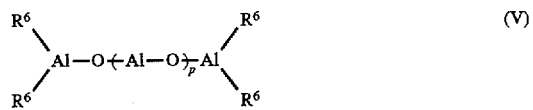  (V)

wherein $R^6$ is an alkyl group having 1 to 20 carbon atoms and may be the same or different; and p is an integer of 0 to 50, preferably 5 to 30, and cyclic aluminoxane represented by the general formula (VI)

  (VI)

wherein $R^6$ is as previously defined and may be the same or different; and q is an integer of 2 to 5, preferably 5 to 30.

Examples of the organoaluminum compound to be used as a starting material for the aluminoxane include a trialkylaluminum such as trimethylaluminum, triethylaluminum and triisobutylaluminum and a mixture thereof. Examples of the condensing agent is water as a typical one and optinally a material capable of undergoing a condensation reaction with the trialkylaluminum which material is exemplified by adsorption water in an inorganic matter and diol.

In the catalyst according to the present invention, the foregoing ionic compound as the component (B) may be used alone or in combination with at least one other ionic compound, and also the aluminoxane may be used alone or in combination with at least one other aluminoxane. Further, at least one of the ionic compounds may be used in combination with at least one of the aluminoxanes.

In the catalyst according to the present invention, a Lewis acid may be used as the component (C) according to the desire and is exemplified by an organoaluminum compound, an organoboron compound, a magnesium compound, a zinc compound and a lithium compound.

Specific examples of the above-mentioned organoaluminum compound include the compound represented by the general formula (VII)

  (VII)

wherein $R^7$ and $R^8$ are each an alkyl group having 1 to 8 carbon atoms and may be the same or different; Z is an halogen atom; r,s,t and u each satisfy the relations 0<r≦3, 0≦s<3, 0≦t<3, 0≦u<3 and r+s+t+u=3.

In the organoaluminum compound represented by the general formula (VII), the compound wherein t=u=0 and r=3 is exemplified by trimethylaluminum, triethylaluminum, triisopropylaluminum, triisobutylaluminum and trioctyaluminum. In the case of t=u=0 and 1.5≦r<3, are included diethylaluminum ethoxide, dibutylaluminum butoxide, diethylaluminum sesquethoxide and dibutylaluminum sesquibutoxide; as well as partially alkoxylated alkylaluminum.

Examples of the compound corresponding to the case where s=t=0 include diethylaluminum dichloride and dibutylaluminum dichloride (r=2); ethylaluminum sesquichloride and butylaluminum sesquichloride (r=1.5); and ethylaluminum dichloride and butylaluminum dichloride (r=1).

Examples of the compound corresponding to the case in which s=u=0 include diethylaluminum hydride and diisobutylaluminum hydride (r=2); and ethylaluminum dihydride and butylaluminum dihydride (r=1).

Examples of the usable organoboron compounds include the compound represented by the general formula (VIII)

$$R^9{}_3BL^3{}_v \quad (VIII)$$

wherein $R^9$ is a hydrocarbon group having 1 to 20 carbon atoms, an aromatic hydrocarbon group having 6 to 20 carbon atoms, a substituted aromatic hydrocarbon group, hydrogen atom or a halogen atom, may be the same or different and specifically exemplified by a phenyl group, tolyl group, fluorophenyl group, trifluoromethylphenyl group, pentafluorophenyl group, fluorine atom, chlorine atom, bromine atom and iodine atom; $L^3$ is a Lewis base and exemplified by an ether compound such as diethyl ether and tetrahydrofuran and an amine compound such as pyridine; and v is an integer from zero (0) to 3.

Examples of the above-mentioned magnesium compound include a Grignard compound such as methylmagnesium bromide, ethylmagnesium bromide, phenylmagnesium bromide and benzylmagnesium bromide, an organomagnesium compound such as diethoxymagnesium and ethylbutylmagnesium and an inorganic magnesium compound such as magnesium chloride. In addition, mention may be made of a zinc compound exemplified by an organozinc compound such as diethylzinc and of a lithium compound exemplified by an organolithium compound such as methyllithium.

In the catalyst according to the present invention, the aforesaid Lewis acid as the component (C) may be used alone or in combination with at least one other Lewis acid.

As described hereinbefore, the catalyst according to the present invention comprises at least two components (A) and the component (B) or at least two components (A), the component (B) and the component (C), but it can be further incorporated with a catalyst component other than the components (A), (B) and (C). The blending ratio of each of the catalyst components varies depending upon various conditions and thus can not be determined unequivocally. In general, however, when the component (B) is the aluminoxane, the molar ratio of the component (A) to the component (B) is selected in the range of preferably 1:1 to 1:10,000, more preferably 1:1 to 1:1,000, and when the component (B) is the ionic compound, the above-mentioned molar ratio is selected in the range of preferably 0.1:1 to 1:0.1. When the component (C) is used in the catalyst, the molar ratio of the component (A) to the component (C) is selected in the range of preferably 1:0.1 to 1:1,000.

As the usable method for mixing each of the catalyst components, mention is made of a method in which as least two components (A) are separately mixed with the component (B) and the component (C) to be used if desired by the procedure hereinafter described; a method in which at least two components (A) are mixed in advance, and the resultant mixture is mixed with the component (B) and the component (C) to be used if desired by the procedure hereafter described; and a method in which at least two components (A) are separately mixed, in the same mixing system, with the component (B) and the component (C) to be used if desired; and the like methods. In addition, as the method for bringing the component (A) into contact with the component (B) and the component (C) to be used if desired, mention is made of ① method in which the contact mixture between the components (A) and (B) is incorporated with the component (C) to form a catalyst, which is brought into contact with a monomer to be polymerized; ② method in which the contact mixture between the component (B) and (C) is incorporated with the component (A) to form a catalyst, which is brought into contact with a monomer to be polymerized; ③ method in which the contact mixture between the components (A) and (C) is incorporated with the component (B) to form a catalyst, which is brought into contact with a monomer to be polymerized; ④ a method in which the components (A), (B) and (C) are each separately brought into contact with a monomer component to be polymerized; ⑤ method in which the contact mixture between a monomer component and the component (C) is brought into contact with the catalyst which has been prepared in any of the above-mentioned methods ①, ② and ③.

The contact among the components (A) and (B) and the component (C) to be used if desired can be put into practice at a temperature in the range of –20° C. to 200° C., needless to say, at the polymerization temperature.

According to the process of the present invention, an aromatic vinyl compound-based polymer composition in which a rubbery elastomer is uniformly mixed is produced by polymerizing an (a) aromatic vinyl compound and (b) at least one member selected from an olefinic compound and a diolefinic compound in the presence of the catalyst which comprises the aforestated components (A) and (B) and the component (C) to be used if desired.

Examples of the (a) aromatic vinyl compound as the monomer component include styrene, alkylstyrenes such as p-methylstyrene; m-methylstyrene; o-methylstyrene; 2,4-dimethylstyrene; 2,5-dimethylstyrene; 3,4-dimethylstyrene; 3,5-dimethylstyrene; and p-tertiary-butylstyrene; halogenated styrenes such as p-chlorostyrene; m-chlorostyrene; o-chlorostyrene; p-bromostyrene; m-bromostyrene; o-bromostyrene; p-fluorostyrene; m-fluorostyrene; o-fluorostyrene and o-methyl-p-fluorostyrene; organosiliconated styrenes, vinylbenzoic acid esters and divinylbenzene. The aromatic vinyl compound may be used alone or in combination with at least one other.

Examples of the (b) olefin as the monomer component include -olefins such as ethylene; propylene; butene-1; pentene-1; hexene-1; heptene-1; octene-1; nonene-1; decene-1; 4-phenylbutene-1; 6-phenylhexene-1; 3-methylbutene-1; 4-methylpentene-1; 3-methylpentene-1; 3-methylhexene-1; 4-methylhexene-1; 5-methylhexene-1; 3,3-dimethylpentene-1; 3,4-dimethylpentene-1; 4,4-dimethylpentene-1; vinylcyclohexane and vinylcyclohexene, halogen-substituted α-olefins such as hexafluoropropene; tetrafluoroethylene; 2-fluoropropene; fluoroethylene; 1,1-difluoroethylene; 3-fluoropropene; trifluoroethylene; and 3,4-dichlorobutene-1; cyclic olefins such as cyclopentene; cyclohexene; norbornene; 5-methylnorbornene; 5-ethylnorbornene; 5-propylnorbornene; 5,6-dimethylnorbornene; 1-methylnorbornene; 7-methylnorbornene; 5,5,6-trimethylnorbornene; 5-phenylnorbornene; 5-benzylnorbonene; and 5-vinylnorbornene.

Examples of diolefin also as the monomer component include straight chain diolefins such as butadiene; isoprene; and 1,6-hexadiene, and cyclic diolefins such as norbornadiene; 5-ethylidenenorbornene; 5-vinylnorbornene; and dicyclopentadiene. The monomer component (b) may be used alone or in combination with at least one other.

The aromatic vinyl compound-based polymer composition which is produced by the method according to the present invention comprises a rubbery elastomer and an aromatic vinyl compound (co)polymer having a high degree of syndiotactic configuration in its aromatic vinyl chains. The rubbery elastomer is a (co)polymer of the above-mentioned olefinic compound and/or diolefinic compound, or a copolymer of the aforesaid compound and the aforesaid aromataic vinyl compound.

Specific examples of the rubbery elastomer include polybutadiene, polyisoprene, polyisobutylene, neoprene, styrene/butadiene copolymer (SBR), styrene/butadiene block copolymer, hydrogenated styrene/butadiene copolymer, ethylene/propylene copolymer, ethylene/butadiene copolymer, ethylene/1-octene copolymer and ethylene/styrene random copolymer, among which ethylene/propylene copolymer, ethylene/1-octene copolymer and ethylene/styrene random copolymer are preferable.

A high degree of syndiotactic configuration in the aromatic vinyl chain of the aromatic vinyl (co)polymer obtained by the process in accordance with the present invention signifies that its stereochemical structure is of high degree of syndiotactic configuration, i,e., the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The aromatic vinyl compound-based (co)polymer having such a high degree of syndiotactic configuration" as mentioned in the present invention usually means polystyrene, poly(substituted styrene), poly(vinyl benzoate), the mixture thereof, and copolymers containing the above polymers as main components, having such a syndiotacticity that the proportion of racemic diad is at least 75%, preferably at least 85%, or the proportion of racemic pentad is at least 30%, preferably at least 50%. The poly(substituted styrene) includes poly(hydrocarbon group-substituted styrene) such as poly(methylstyrene), poly(ethylstyrene), poly(isopropylstyrene), poly(phenylstyrene) and poly (vinylstyrene); poly(halogenated styrene) such as poly (chlorostyrene), poly(bromostyrene), and poly (fluorostyrene); and poly(alkoxystyrene) such as poly (methoxystyrene) and poly(ethoxystyrene).

The aromatic vinyl compound-based polymer composition can be produced by any of a variety of processes such as (1) a process in which an aromatic vinyl compound is polymerized simultaneously with an olefinic compound and/or a diolefinic compound that are allowed to coexit therewith in the polymerization system; (2) a multi-stage process in which an aromatic vinyl compound polymer is at first produced and after the elapse of a desirable time, an olefinic compound and/or a diolefinic compound are added to the resultant polymer to polymerize in the second stage; and (3) a multi-stage process in which an olefinic compound and/or a diolefinic compound are at first polymerized and after the elapse of a desirable time, an aromatic vinyl compound is added to the resulting polymer to polymerize in the second stage.

The polymerization method may be bulk polymerization method without specific limitaion. The polymerization may be also carried out in an aliphatic hydrocarbon solvent such as pentane, hexane and heptane, an alicyclic hydrocarbon solvent such as cyclohexane or an aromatic hydrocarbon solvent such as benzene, toluene, xylene and ethylbenzene.

The polymerization temperature is usually 0° to 200° C., preferably 20° to 100° C. In the case where a gaseous monomer is employed, the partial pressure of the gaseous monomer is usually 100 kg/cm$^2$ (9.80665×10$^6$ Pa) or lower, preferably 30 kg/cm$^2$ (2.94199×10$^6$ Pa) or lower.

The modification of the molecular weight of the aromatic vinyl compound polymer and the rubbery elastomer to be obtained can effectively be made by effecting the polymerization reaction in the presence of hydrogen.

In the following, the present invention will be described more specifically with reference to examples, which however, shall not be construed to limit the present invention thereto.

EXAMPLE 1

(1) Preparation of polymerization catalyst

N,N-dimethylanilinium tetrakis(pentafluorophenyl)borate in an amount of 0.052 g was suspended in 14.8 mL (milliliter) of toluene. Subsequently, the resultant suspension was mixed with 0.8 mL of 2 mol/L (liter) solution of triisobutylaluminum in toluene at room temperature for 10 minutes in an atmosphere of nitrogen and then the resultant mixture was incorporated with 0.4 mL of 10 mmol/L solution of (tert-butyramide)(2,3,4,5-tetramethylcyclopentadienyl)dimethylsilyltitanium dichloride in toluene and subsequently with 4 mL of 10 mmol/L solution of (1,2,3,4-tetramethylcyclopentadienyl)titanium trimethoxide in toluene under stirring for 2 hours at room temperature to prepare a reddish brown catalyst solution.

(2) Polymerization

Purified dried styrene in an amount of 400 mL placed in a 1 L SUS-made autoclave was heated to 50° C., incorporated with 0.1 mL of 2 mol/L solution of triisobutylaluminum in toluene with stirring for 10 minutes, and thereafter incorporated with 10 mL of the above-prepared catalyst solution in a stream of nitrogen. Immediately thereafter the reaction system was enclosed and depressurized and subsequently ethylene was continuously introduced into the autoclave so as to attain a constant partial pressure of ethylene being 8 kg/cm$^2$ to effect polymerization reaction at 50° C. for 2 hours. After the unreacted ethylene was discharged, 100 mL of methanol was added in the reaction system to arrest the reaction. The content in the autoclave was washed with 2 L of methanol, and the precipitate was collected by filtration and dried under reduced pressure at 80° C. for 12 hours to recover 93.9 g of polymer.

The polymer of 5.02 g was subjected to Soxhlet extraction for 5 hours by the use of boiling methyl ethyl ketone to recover 4.36 g of objective polymer as the insoluble portion. There were observable, in the methyl ethyl ketone-insoluble polymer, a glass transition point of 23° C. assigned to ethylene/styrene random copolymer as the rubbery elastomer; a glass transition point of 99° C. assigned to styrene/styrene chain of the styrenic polymer having a syndiotactic configuration; and a crystal melting point of 267° C. assigned to styrene/styrene chain of the styrenic polymer having a syndiotactic configuration. The objective polymer had a proportion of racemic diad of 90% as determined by $^{13}$C-NMR analysis method. There was not substantially observed a signal assigned to styrene other than the styrene of syndiotactic configuration, except for a signal assigned to the styrene unit of the ethylene/styrene random copolymer. The objective polymer was found to be a polymer composition which had an intrinsic viscosity [η] of 2.81 deciliter/g as measured in trichlorobenzene at 135° C. and which consisted of 42.6% by weight of syndiotactic polystyrene and 57.4% by weight of ethylene/styrene random copolymer having a molar ratio of ethylene unit/styrene unit of 1:1.

EXAMPLE 2

(1) Preparation of polymerization catalyst

The procedure in Example 1-(1) was repeated to prepare catalyst solution except that (pentamethylcyclopentadienyl) titanium trimethoxide was used in place of the (1,2,3,4-tetramethylcyclopentadienyl)titanium trimethoxide. The solution thus obtained was reddish brown solution.

(2) Polymerization

The procedure in Example 1-(2) was repeated except that there was used the catalyst solution which had been prepared in the above item (1). As a result, a polymer of 96.9 g on dry basis was recovered and 4.86 g of the polymer was subjected to Soxhlet extraction for 5 hours by the use of boiling methyl ethyl ketone to recover 4.32 g of objective polymer as the insoluble portion. There were observable, in the methyl ethyl ketone-insoluble polymer, a glass transition point of 31° C. assigned to ethylene/styrene random copolymer as the rubbery elastomer; and a crystal melting point of 267° C. assigned to styrene/styrene chain of the styrenic polymer having a syndiotactic configuration. The objective polymer was found to be a polymer composition which had an intrinsic viscosity [η] of 1.50 deciliter/g as measured in trichlorobenzene at 135° C. and which consisted of 49.1% by weight of syndiotactic polystyrene and 50.9% by weight of ethylene/styrene random copolymer having a molar ratio of ethylene unit/styrene unit of 1:1.

EXAMPLE 3

(1) Preparation of polymerization catalyst

The procedure in Example 1-(1) was repeated to prepare catalyst solution except that toluene was used in an amount of 14.4 mL in place of 14.8 mL and that the 10 mmol/L solution of (tert-butyramide)(2,3,4,5-tetramethylcyclopentadienyl)dimethylsilyltitanium dichloride was used in an amount of 0.8 mL in place of 0.4 mL. The solution thus obtained was reddish brown solution.

(2) Polymerization

The procedure in Example 1-(2) was repeated except that there was used the catalyst solution which had been prepared in the above item (1). As a result, a polymer of 110.6 g on dry basis was recovered and 5.12 g of the polymer was subjected to Soxhlet extraction for 5 hours by the use of boiling methyl ethyl ketone to recover 4.76 g of objective polymer as the insoluble portion. There were observable, in the methyl ethyl ketone-insoluble polymer, a glass transition point of 23° C. assigned to ethylene/styrene random copolymer as the rubbery elastomer; and a crystal melting point of 265° C. assigned to styrene/styrene chain of the styrenic polymer having a syndiotactic configuration. The objective polymer was found to be a polymer composition which had an intrinsic viscosity [η] of 2.59 deciliter/g as measured in trichlorobenzene at 135° C. and which consisted of 67.1% by weight of syndiotactic polystyrene and 32.9% by weight of ethylene/styrene random copolymer having a molar ratio of ethylene unit/styrene unit of 1:1.

EXAMPLE 4

(1) Preparation of polymerization catalyst 1.0 mL of 2 mol/L solution of triisobutylaluminum in toluene was diluted with 12.5 mL of toluene and was incorporated with 0.5 mL of 10 mmol/L solution of (tert-butyramide)dimethylsilyltitanium dichloride in toluene and subsequently with 5 mL of 10 mmol solution of (1,2,3,4-tetramethylcyclopentadienyl)titanium trimethoxide in toluene under stirring at room temperature for 30 minute and further with 6 mL of 10 mmol/L solution of 4,4',4"-trimethoxyphenylcarbenium tetrakis(pentafluorophenyl) borate in toluene. The polymer thus obtained was brown solution.

(2) Polymerization

The procedure in Example 1 was repeated except that there was used the catalyst solution which had been prepared in the above item (1). As a result, a polymer of 98.2 g on dry basis was recovered and 4.93 g of the polymer was subjected to Soxhlet extraction for 5 hours by the use of boiling methyl ethyl ketone to recover 4.19 g of objective polymer as the insoluble portion. There were observable, in the methyl ethyl ketone-insoluble polymer, a glass transition point of 26° C. assigned to ethylene/styrene random copolymer as the rubbery elastomer; and a crystal melting point of 267° C. assigned to styrene/styrene chain of the styrenic polymer having a syndiotactic configuration. The objective polymer was found to be a polymer composition which had an intrinsic viscosity [η] of 2.70 deciliter/g as measured in trichlorobenzene at 135° C.

EXAMPLE 5

Purified styrene in an amount of 400 mL placed in a 1 L SUS-made autoclave was heated to 70° C., incorporated with 2.0 mL of 2 mol/L solution of triisobutylaluminum in toluene and subsequently with 4 mL of 1 mol/L solution of methylaluminoxane in toluene with stirring for 10 minutes. Thereafter, to the resultant mixture were added, in a stream of nitrogen, 0.2 mL of 10 mmol/L solution of (tert-butyramide)(2,3,4,5-tetramethylcyclopentadienyl) dimethylsilyltitanium dichloride in toluene and subsequently 2 mL of 10 mmol/L solution of (1,2,3,4-tetramethylcyclopentadienyl)titanium trimethoxide in toluene. Immediately thereafter the reaction system was enclosed and depressurized and subsequently ethylene was continuously introduced into the autoclave so as to attain a constant partial pressure of ethylene being 8 kg/cm² to effect polymerization reaction at 70° C. for 2 hours. After the unreacted ethylene was discharged, 100 mL of methanol was added in the reaction system to arrest the reaction. The content in the autoclave was washed with 2 L of methanol, and the precipitate was collected by filtration and dried under reduced pressure at 80° C. for 12 hours to recover 97.9 g of polymer.

The polymer in an amount of 4.95 g was subjected to Soxhlet extraction for 5 hours by the use of boiling methyl ethyl ketone to recover 4.19 g of objective polymer as the insoluble portion. There were observable, in the methyl ethyl ketone-insoluble polymer, a glass transition point of 33° C. assigned to ethylene/styrene random copolymer as the rubbery elastomer; and a crystal melting point of 268° C. assigned to styrene/styrene chain of the styrenic polymer having a syndiotactic configuration. The objective polymer was found to be a polymer composition which had an intrinsic viscosity [η] of 0.77 deciliter/g as measured in trichlorobenzene at 135° C. and which consisted of 70.3% by weight of syndiotactic polystyrene and 29.7% by weight of ethylene/styrene random copolymer having a molar ratio of ethylene unit/styrene unit of 1:1.

INDUSTRIAL APPLICABILITY

The use of the catalyst having a high activity according to the present invention, makes it possible to efficiently produce, in a reaction system, a resin composition in which an aromatic vinyl compound-based polymer having a syndiotactic configuration and a rubbery elastomer are uniformly mixed. The above-mentioned resin composition, in which the aromatic vinyl compound-based polymer having a syndiotactic configuration and the rubbery elastomer such as a styrene/olefin copolymer and a styrene/diolefin copolymer are uniformly mixed, is excellent in toughness, tensile strength and impact resistance as well as heat resistance and chemical resistance and thus is preferably used as raw materials for a variety of molded products.

We claim:

1. A catalyst for producing an aromatic vinyl compound-based polymer composition which catalyst comprises (A) at least two different transition metal compounds each having one π-ligand; said compound being represented by the formula (I)

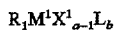
   $$R_1M^1X^1_{a-1}L_b \qquad (I)$$

wherein $R^1$ is a π-ligand selected from the group consisting of a cyclopentadienyl group, a methylcyclopentadienyl group, a 1,2-dimethylcyclopentadienyl group, a 1,3-dimethylcyclopentadienyl group, a 1,3-di(tert-butyl) cyclopentadienyl group, a 1,3-(trimethylsilyl) cyclopentadienyl group, a 1,2,3-trimethylcyclopentadienyl group, a 1,2,4-trimethylcyclopentadienyl group, a 1,2,3,4-tetramethylcyclopentadienyl group, a pentamethyl cyclopentadienyl group, a 1-ethyl-2,3,4,5-tetramethylcyclopentadienyl group, a 1-benzyl-2,3,4,5-tetramethylcyclopentadienyl group, a 1-phenyl-2,3,4,5-tetramethylcyclopentadienyl group, a 1-trimethylsilyl-2,3,4,5-tetramethylcyclopentadienyl group, a 1-trifluoromethyl-2,3,4,5-tetramethylcyclopentadienyl group, a 1,2,3-trimethylindenyl group, a heptamethylindenyl group and a 1,2,4,5,6,7-hexamethylindenyl group;

$M^1$ is a transition metal in the groups 3 to 6 of the Periodic table;

$X^1$ is a σ-ligand and a plurality of $X^1$ may be the same or different;

L is a Lewis base;

a is the valency of $M^1$;

b is 0, 1 or 2; and when L is plural, each L may be the same or different, and comprises a transition metal compound having one π-ligand, said compound being represented by the formula (II)

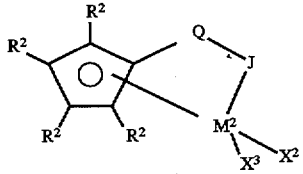

wherein $R^2$ is a hydrogen atom, a hydrocarbon group having 1 to 20 carbon atoms or a aromatic hydrocarbon group having 6 to 20 carbon atoms and a plurality of $R^2$ may be the same or different and may form a ring;

$M^2$ is a transition metal in the groups 3 to 6 of the Periodic table;

$X^2$ and $X^3$ are each a σ-ligand and may be the same or different;

Q is a hydrocarbon group having 1 to 6 carbon atoms, an aromatic hydrocarbon group having 6 to 20 carbon atoms, a silylene group having 1 to 5 silicon atoms or a germylene group having 1 to 5 germanium group; and J is an amide group, a phosphide group, an oxygen atom, a sulfur atom or an alkylidene group; and (B) an ionic compound comprising a noncoordinate anion and a cation.

2. A catalyst for producing an aromatic vinyl compound-based polymer composition which catalyst comprises (A) at least two different transition metal compounds each having one π-ligand the formula (I)

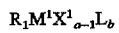
   $$R_1M^1X^1_{a-1}L_b \qquad (I)$$

wherein $R^1$ is a π-ligand selected from the group consisting of a cyclopentadienyl group, a methylcyclopentadienyl group, a 1,2-dimethylcyclopentadienyl group, a 1,3-dimethylcyclopentadienyl group, a 1,3-di(tert-butyl) cyclopentadienyl group, a 1,3-(trimethylsilyl) cyclopentadienyl group, a 1,2,3-trimethylcyclopentadienyl group, a 1,2,4-trimethylcyclopentadienyl group, a 1,2,3,4-tetramethylcyclopentadienyl group, a pentamethyl cyclopentadienyl group, a 1-ethyl-2,3,4,5-tetramethylcyclopentadienyl group, a 1-benzyl-2,3,4,5-tetramethylcyclopentadienyl group, a 1-phenyl-2,3,4,5-tetramethylcyclopentadienyl group, a 1-trimethylsilyl-2,3,4,5-tetramethylcyclopentadienyl group, a 1-trifluoromethyl-2,3,4,5-tetramethylcyclopentadienyl group, a 1,2,3-trimethylindenyl group, a heptamethylindenyl group and a 1,2,4,5,6,7-hexamethylindenyl group;

$M^1$ is a transition metal in the groups 3 to 6 of the Periodic table;

$X^1$ is a σ-ligand and a plurality of $X^1$ may be the same or different;

L is a Lewis base;

a is the valency of $M^1$;

b is 0, 1 or 2; and when L is plural, each L may be the same or different, and comprises a transition metal compound having one π-ligand, said compound being represented by the formula (II)

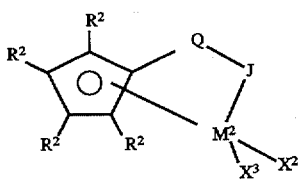

wherein $R^2$ is a hydrogen atom, a hydrocarbon group having 1 to 20 carbon atoms or a aromatic hydrocarbon group having 6 to 20 carbon atoms and a plurality of $R^2$ may be the same or different and may form a ring;

$M^2$ is a transition metal in the groups 3 to 6 of the Periodic table;

$X^2$ and $X^3$ are each a σ-ligand and may be the same or different;

Q is a hydrocarbon group having 1 to 6 carbon atoms, an aromatic hydrocarbon group having 6 to 20 carbon atoms, a silylene group having 1 to 5 silicon atoms or a germylene group having 1 to 5 germanium group; and J is an amide group, a phosphide group, an oxygen atom, a sulfur atom or an alkylidene group; and (B) an aluminoxane.

3. The catalyst for producing an aromatic vinyl compound-based polymer composition according to claim 2, wherein said aluminoxane as the component (B) is a chain aluminoxane or a cyclic aluminoxane.

4. A catalyst for producing an aromatic vinyl compound-based polymer composition which catalyst comprises (A) at least two different transition metal compounds each having one π-ligand; said compound being represented by the formula (I)

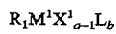   (I)

wherein

R¹ is a π-ligand selected from the group consisting of a cyclopentadienyl group, a methylcyclopentadienyl group, a 1,2-dimethylcyclopentadienyl group, a 1,3-dimethylcyclopentadienyl group, a 1,3-di(tert-butyl) cyclopentadienyl group, a 1,3-(trimethylsilyl) cyclopentadienyl group, a 1,2,3-trimethylcyclopentadienyl group, a 1,2,4-trimethylcyclopentadienyl group, a 1,2,3,4-tetramethylcyclopentadienyl group, a pentamethyl cyclopentadienyl group, a 1-ethyl-2,3,4,5-tetramethylcyclopentadienyl group, a 1-benzyl-2,3,4,5-tetramethylcyclopentadienyl group, a 1-phenyl-2,3,4,5-tetramethylcyclopentadienyl group, a 1-trimethylsilyl-2,3,4,5-tetramethylcyclopentadienyl group, a 1-trifluoromethyl-2,3,4,5-tetramethylcyclopentadienyl group, a 1,2,3-trimethylindenyl group, a heptamethylindenyl group and a 1,2,4,5,6,7-hexamethylindenyl group;

M¹ is a transition metal in the groups 3 to 6 of the Periodic table;

X¹ is a σ-ligand and a plurality of X¹ may be the same or different;

L is a Lewis base;

a is the valency of M¹;

b is 0, 1 or 2; and when L is plural, each L may be the same or different, and comprises a transition metal compound having one π-ligand, said compound being represented by the formula (II)

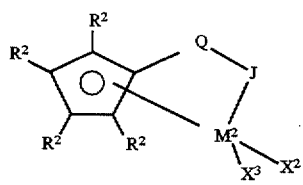   (II)

wherein

R² is a hydrogen atom, a hydrocarbon group having 1 to 20 carbon atoms or a aromatic hydrocarbon group having 6 to 20 carbon atoms and a plurality of R² may be the same or different and may form a ring;

M² is a transition metal in the groups 3 to 6 of the Periodic table;

X² and X³ are each a σ-ligand and may be the same or different;

Q is a hydrocarbon group having 1 to 6 carbon atoms, an aromatic hydrocarbon group having 6 to 20 carbon atoms, a silylene group having 1 to 5 silicon atoms or a germylene group having 1 to 5 germanium group; and J is an amide group, a phosphide group, an oxygen atom, a sulfur atom or an alkylidene group; and (B) an ionic compound comprising a noncoordinate anion and a cation and an aluminoxane.

5. The catalyst for producing an aromatic vinyl compound-based polymer composition according to claim 4, wherein said aluminoxane as the component (B) is a chain aluminoxane or a cyclic aluminoxane.

6. A catalyst for producing an aromatic vinyl compound-based polymer composition which catalyst comprises (A) at least two different transition metal compounds each having one π-ligand; said compound being represented by the formula (I)

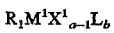   (I)

wherein

R¹ is a π-ligand selected from the group consisting of a cyclopentadienyl group, a methylcyclopentadienyl group, a 1,2-dimethylcyclopentadienyl group, a 1,3-dimethylcyclopentadienyl group, a 1,3-di(tert-butyl) cyclopentadienyl group, a 1,3-(trimethylsilyl) cyclopentadienyl group, a 1,2,3-trimethylcyclopentadienyl group, a 1,2,4-trimethylcyclopentadienyl group, a 1,2,3,4-tetramethylcyclopentadienyl group, a pentamethyl cyclopentadienyl group, a 1-ethyl-2,3,4,5-tetramethylcyclopentadienyl group, a 1-benzyl-2,3,4,5-tetramethylcyclopentadienyl group, a 1-phenyl-2,3,4,5-tetramethylcyclopentadienyl group, a 1-trimethylsilyl-2,3,4,5-tetramethylcyclopentadienyl group, a 1-trifluoromethyl-2,3,4,5-tetramethylcyclopentadienyl group, a 1,2,3-trimethylindenyl group, a heptamethylindenyl group and a 1,2,4,5,6,7-hexamethylindenyl group;

M¹ is a transition metal in the groups 3 to 6 of the Periodic table;

X¹ is a σ-ligand and a plurality of X¹ may be the same or different;

L is a Lewis base;

a is the valency of M¹;

b is 0, 1 or 2; and when L is plural, each L may be the same or different, and comprises a transition metal compound having one π-ligand, said compound being represented by the formula (II)

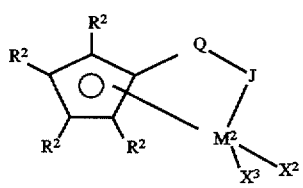   (II)

wherein

R² is a hydrogen atom, a hydrocarbon group having 1 to 20 carbon atoms or a aromatic hydrocarbon group having 6 to 20 carbon atoms and a plurality of R² may be the same or different and may form a ring;

M² is a transition metal in the groups 3 to 6 of the Periodic table;

X² and X³ are each a σ-ligand and may be the same or different;

Q is a hydrocarbon group having 1 to 6 carbon atoms, an aromatic hydrocarbon group having 6 to 20 carbon atoms, a silylene group having 1 to 5 silicon atoms or a germylene group having 1 to 5 germanium group; and J is an amide group, a phosphide group, an oxygen atom, a sulfur atom or an alkylidene group; and (B) an ionic compound comprising a noncoordinate anion and a cation; and (C) a Lewis acid.

7. A catalyst for producing an aromatic vinyl compound-based polymer composition which catalyst comprises (A) at least two different transition metal compounds each having one π-ligand; said compound being represented by the formula (I)

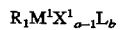   (I)

wherein

R¹ is a π-ligand selected from the group consisting of a cyclopentadienyl group, a methylcyclopentadienyl group, a 1,2-dimethylcyclopentadienyl group, a 1,3- dimethylcyclopentadienyl group, a 1,3-di(tert-butyl) cyclopentadienyl group, a 1,3-(trimethylsilyl) cyclopentadienyl group, a 1,2,3-trimethylcyclopentadienyl group, a 1,2,4-trimethylcyclopentadienyl group, a 1,2,3,4-tetramethylcyclopentadienyl group, a pentamethyl cyclopentadienyl group, a 1-ethyl-2,3,4,5-tetramethylcyclopentadienyl group, a 1-benzyl-2,3,4,5-tetramethylcyclopentadienyl group, a 1-phenyl-2,3,4,5-tetramethylcyclopentadienyl group, a 1-trimethylsilyl-2,3,4,5-tetramethylcyclopentadienyl group, a 1-trifluoromethyl-2,3,4,5-tetramethylcyclopentadienyl group, a 1,2,3-trimethylindenyl group, a heptamethylindenyl group and a 1,2,4,5,6,7-hexamethylindenyl group;

$M^1$ is a transition metal in the groups 3 to 6 of the Periodic table;

$X^1$ is a σ-ligand and a plurality of $X^1$ may be the same or different;

L is a Lewis base;

a is the valency of $M^1$;

b is 0, 1 or 2; and when L is plural, each L may be the same or different, and comprises a transition metal compound having one π-ligand, said compound being represented by the formula (II)

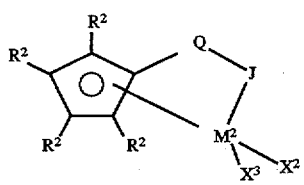

(II)

wherein $R^2$ is a hydrogen atom, a hydrocarbon group having 1 to 20 carbon atoms or a aromatic hydrocarbon group having 6 to 20 carbon atoms and a plurality of $R^2$ may be the same or different and may form a ring;

$M^2$ is a transition metal in the groups 3 to 6 of the Periodic table;

$X^2$ and $X^3$ are each a σ-ligand and may be the same or different;

Q is a hydrocarbon group having 1 to 6 carbon atoms, an aromatic hydrocarbon group having 6 to 20 carbon atoms, a silylene group having 1 to 5 silicon atoms or a germylene group having 1 to 5 germanium group; and J is an amide group, a phosphide group, an oxygen atom, a sulfur atom or an alkylidene group;

(B) an aluminoxane; and (C) a Lewis acid.

8. The catalyst for producing an aromatic vinyl compound-based polymer composition according to claim 7, wherein said aluminoxane as the component (B) is a chain aluminoxane or a cyclic aluminoxane.

9. A catalyst for producing an aromatic vinyl compound-based polymer composition which catalyst comprises (A) at least two different transition metal compounds each having one π-ligand; said compound being represented by the formula (I)

$$R_1 M^1 X^1_{a-1} L_b$$ (I)

wherein $R^1$ is a π-ligand selected from the group consisting of a cyclopentadienyl group, a methylcyclopentadienyl group, a 1,2-dimethylcyclopentadienyl group, a 1,3-dimethylcyclopentadienyl group, a 1,3-di(tert-butyl) cyclopentadienyl group, a 1,3-(trimethylsilyl) cyclopentadienyl group, a 1,2,3-trimethylcyclopentadienyl group, a 1,2,4-trimethylcyclopentadienyl group, a 1,2,3,4-tetramethylcyclopentadienyl group, a pentamethyl cyclopentadienyl group, a 1-ethyl-2,3,4,5-tetramethylcyclopentadienyl group, a 1-benzyl-2,3,4,5-tetramethylcyclopentadienyl group, a 1-phenyl-2,3,4,5-tetramethylcyclopentadienyl group, a 1-trimethylsilyl-2,3,4,5-tetramethylcyclopentadienyl group, a 1-trifluoromethyl-2,3,4,5-tetramethylcyclopentadienyl group, a 1,2,3-trimethylindenyl group, a heptamethylindenyl group and a 1,2,4,5,6,7-hexamethylindenyl group;

$M^1$ is a transition metal in the groups 3 to 6 of the Periodic table;

$X^1$ is a σ-ligand and a plurality of $X^1$ may be the same or different;

L is a Lewis base;

a is the valency of $M^1$;

b is 0, 1 or 2; and when L is plural, each L may be the same or different, and comprises a transition metal compound having one π-ligand, said compound being represented by the formula (II)

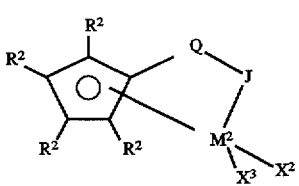

(II)

wherein $R^2$ is a hydrogen atom, a hydrocarbon group having 1 to 20 carbon atoms or a aromatic hydrocarbon group having 6 to 20 carbon atoms and a plurality of $R^2$ may be the same or different and may form a ring;

$M^2$ is a transition metal in the groups 3 to 6 of the Periodic table;

$X^2$ and $X^3$ are each a σ-ligand and may be the same or different;

Q is a hydrocarbon group having 1 to 6 carbon atoms, an aromatic hydrocarbon group having 6 to 20 carbon atoms, a silylene group having 1 to 5 silicon atoms or a germylene group having 1 to 5 germanium group; and J is an amide group, a phosphide group, an oxygen atom, a sulfur atom or an alkylidene group;

(B) an ionic compound comprising a noncoordinate anion and a cation and an aluminoxane; and (C) a Lewis acid.

10. The catalyst for producing an aromatic vinyl compound-based polymer composition according to claim 9, wherein said aluminoxane as the component (B) is a chain aluminoxane or a cyclic aluminoxane.

11. A process for producing an aromatic vinyl compound-based polymer composition having a high degree of syndiotactic configuration in its aromatic vinyl chains which process comprises polymerizing an (a) aromatic vinyl compound and (b) at least one member selected from olefinic compounds and diolefinic compounds in the presence of the catalyst as set forth in claim 1.

* * * * *